Patented June 3, 1952

2,599,144

UNITED STATES PATENT OFFICE 2,599,144

POLYMERIC N-BOROUREAS AND THEIR PREPARATION

Robert W. Upson, Wilmington, Del., assignor to E. I. du Pont de Nemours & Company, Wilmington, Del., a corporation of Delaware No Drawing. Application March 9, 1949, Serial No. 80,567

8 Claims. (Cl. 260—77.5)

This invention relates to polymeric organo-boron compounds and to methods for their preparation.

Organo-boron compounds of various types are described in the literature. Of the known organo-boron compounds, those having the boron atoms bonded to a nitrogen atom are among the most stable. Because of this stability such compounds are desirable for use in various applications, but the hitherto known methods for producing a boron-nitrogen bond are not entirely satisfactory.

It is an object of this invention to provide new organo-boron compounds and methods for their preparation. A further object is to provide an improved method for producing the boron-nitrogen bond. Another object is to provide organo-boron compounds containing the =B—N= group. A still further object is to provide new organo-boron polymeric compounds. Other objects will appear hereinafter.

These objects are accomplished by the following invention of N-boroureas and a process for preparing them which comprises heating a boronic acid or an ester thereof with a diurea having at least one hydrogen atom on each terminal nitrogen atom at a temperature at which the water or alcohol formed in the reaction as a by-product is eliminated. The new products of this invention are polymeric N-boroureas. These N-boroureas contain the group

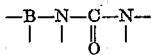

Preferred compounds of this invention contain the group

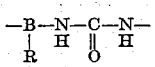

where R is hydrocarbon or chlorohydrocarbon, and particularly preferred compounds contain the group

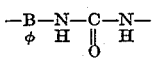

whereby $\phi$ is phenyl, $C_6H_5$—.

These N-boroureas are obtained by heating a boronic acid or an ester of a boronic acid, e. g., benzeneboronic acid or diethyl benzeneboronate, with a diurea or a substituted diurea having at least one hydrogen atom on each of the two terminal amido nitrogen atoms at a temperature of from 100° to 300° C. until the water or alcohol formed as a by-product is eliminated, i. e., vaporized from the reaction. The exact temperature used is not critical but it should not be so high that the reactants or the product are decomposed. The heating is conveniently carried out at atmospheric pressure, but reduced pressure can be used if desired. In the latter case lower temperatures can be used to remove the water or alcohol. At the completion of the reaction, which is indicated by the cessation of the formation of by-product water or alcohol, any remaining volatile materials are removed from the reaction mixture by distillation at atmospheric or reduced pressure, and the polymeric N-borourea remains as a solid residue.

When a diurea, i. e., a compound containing two urea nuclei and having at least one hydrogen on each of the terminal nitrogen atoms, is heated with a boronic acid or an ester thereof at a temperature of from 100° C. to 300° C. under atmospheric or reduced pressure until the water or alcohol formed as a by-product is eliminated, a polymeric N-borourea is formed. At the completion of the reaction volatile materials are removed by heating under reduced pressure and the polymeric N-borourea remains as a solid residue. In this invention the preferred diureas are the alkylene diureas having from 1 to 20 carbon atoms in the alkylene chain. These preferred polymeric N-boroureas have the recurring structural unit

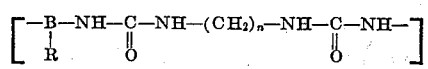

where R is an organic radical, preferably hydrocarbon, and n is a positive integer from 1 to 20.

The invention is illustrated by the following examples in which the proportions of ingredients are expressed in parts by weight unless otherwise noted.

*Example I*

A mixture of 12.2 parts of benzeneboronic acid and 20.2 parts of hexamethylene diurea is pulverized in a mortar and the mixture is then heated in a reaction vessel for 10 minutes at 225–240° C. A viscous melt is formed which is then heated for 35 minutes at 240–265° C. and for another 25 minutes at 260–265° C. under a pressure of 15 mm. of mercury. The resulting polymeric N-borourea is a light yellow brittle solid amounting to 26 parts. This polymer is soluble in phenol and formic acid, slightly soluble in benzene, and insoluble in methanol, ethanol, acetone, chloroform, carbon tetrachloride, dioxane, water, acetic acid, and dimethylformamide. Analyses indicate that the polymer contains 5.8% boron and 19.1% nitrogen. The polymer softens at a temperature of 225° C. and can be pressed into films at 250° C. which are clear, colorless and strong.

*Example II*

A mixture of 17.8 parts of diethyl benzeneboronate and 20.2 parts of hexamethylenediurea is placed in a reaction vessel and heated for 2.5 hours at 190–200° C. The volatile materials are removed from the reaction mixture by distillation at atmospheric pressure. The non-volatile solid residue from this distillation is pulverized in a mortar, washed with acetone and dried. There is obtained 22 parts of polymeric N-borourea containing 2.0% boron and 20.1% nitrogen. This polymer softens at 105° C. and can be pressed into films at the same temperature.

In addition to the benzeneboronic acid and diethyl benzeneboronate employed in the above examples, any other boronic acid or ester thereof in which the boronic acid or ester group is the sole reactive group can be used in the process of this invention. These include the aliphatic, aromatic, cycloaliphatic, saturated and unsaturated, hydrocarbon, chlorohydrocarbon, alkoxyhydrocarbon and aryloxyhydrocarbon boronic acids. Other specific boronic acids of these types which can be employed include p-tolueneboronic acid, butaneboronic acid, allylboronic acid, beta-chlorovinylboronic acid, cyclohexaneboronic acid, phenylmethaneboronic acid, alpha-naphthaleneboronic acid, p-chlorobenzeneboronic acid, p-phenoxybenzeneboronic acid, and p-methoxybenzeneboronic acid. Likewise, esters of these acids with any alcohol are also operable in the process of this invention. Specific examples of such esters include the methyl, ethyl, butyl, hexyl, and phenyl esters of the above-named boronic acids. Since the alcohol radical of the boronic acid ester merely forms a by-product in the reaction it is preferable, for economic reasons, to use boronic esters of the lower aliphatic alcohols, i. e., aliphatic monohydric alcohols having 1 to 6 carbon atoms. A particularly preferred class of boronic acids, and their esters, for use in the process of this invention are those containing the

 group e. g., benzeneboronic acid, p-tolueneboronic acid, beta-chlorovinylboronic acid, and their esters. These boronic acids and esters are in general more resistant to oxidative cleavage of the boron-carbon bond than those containing the

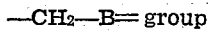 group

In addition to the specific diurea of the examples, any other diurea having at least one hydrogen atom on each terminal amido nitrogen can be used in the practice of this invention. Specific examples of diureas that can be substituted for those of the examples include biuret,

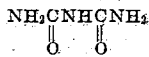

and the alkylene diureas, e. g., methylene-, ethylene-, hexamethylene-, decamethylene- and octadecamethylene-diureas. The alkylene diureas having alkylene radicals of from 1 to 20 carbon atoms are especially preferred for producing the polymeric N-boroureas of this invention.

The preferred polymeric N-boroureas have the recurring structural unit

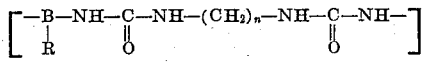

where $n$ is a positive integer from 1 to 20 and R is hydrocarbon or chlorohydrocarbon, particularly hydrocarbon or chlorohydrocarbon containing the

group directly joined to boron. However, R can be any monovalent hydrocarbon or chlorohydrocarbon radical, for example, alkyl such as methyl, alkenyl such as allyl, chloroalkenyl such as chlorovinyl, cycloalkyl such as cyclohexyl, aryl such as phenyl, naphthyl and tolyl, or chloroaryl such as chlorophenyl. Hydrocarbon and chlorohydrocarbon radicals of from 1 to 20 carbon atoms are especially preferred.

The proportions of the boronic acid or ester and the diurea used in the practice of this invention are not critical. Preferably they are used in equimolecular proportions; however, an excess of either reactant can be used if desired.

The polymeric N-boroureas of this invention are useful for the preparation of shaped articles such as fibers and films.

As many apparently widely different embodiments of this invention may be made without departing from the spirit and scope thereof, it is to be understood that this invention is not limited to the specific embodiments thereof except as defined in the appended claims.

I claim:

1. A process for preparing a polymeric N-borourea which comprises reacting a compound selected from the group consisting of biuret and an alkylene diurea having at least one hydrogen atom on each terminal nitrogen atom with a compound selected from the group consisting of hydrocarbon, chlorohydrocarbon, alkoxyhydrocarbon and aryloxyhydrocarbon boronic acids and monohydric alcohol esters thereof, said reactants being heated below 300° C. to a temperature at which a compound from the class consisting of water and alcohol formed in the reaction is vaporized from the reaction mixture.

2. A process for preparing a polymermic N-borourea which comprises heating below 300° C. an alkylene diurea having at least one hydrogen atom on each terminal nitrogen atom with a hydrocarbon boronic acid to a temperature at which water formed in the reaction is vaporized from the reaction mixture.

3. A process for preparing a polymeric N-borourea which comprises heating below 300° C. an alkylene diurea having at least one hydrogen atom on each terminal nitrogen atom with a hydrocarbon boronate to a temperature at which alcohol formed in the reaction is vaporized from the reaction mixture.

4. A process for preparing a polymeric N-borourea which comprises heating below 300° C. benzeneboronic acid with hexamethylene diurea to a temperature at which water formed in the reaction is vaporized from the reaction mixture.

5. A process for preparing a polymeric N-borourea which comprises heating below 300° C. diethyl benzeneboronate with hexamethylene diurea to a temperature at which alcohol formed in the reaction is vaporized from the reaction mixture.

6. A polymeric N-borourea having as the sole recurring structural units

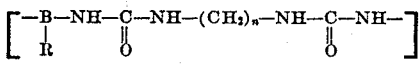

wherein $n$ is a positive integer from 1 to 20 and R is a member selected from the group consisting of hydrocarbon, chlorohydrocarbon, alkoxyhydrocarbon and aryloxyhydrocarbon radicals.

7. A polymeric N-borourea having as the sole recurring structural units

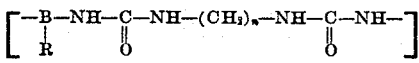

wherein $n$ is a positive integer from 1 to 20 and R is a monovalent hydrocarbon radical.

8. A polymeric N-borourea having as the sole recurring structural units

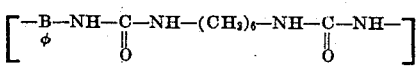

wherein $\phi$ is the phenyl radical, $C_6H_5-$.

ROBERT W. UPSON.

REFERENCES CITED

The following references are of record in the file of this patent:

UNITED STATES PATENTS

| Number | Name | Date |
| --- | --- | --- |
| 2,366,129 | Rust | Dec. 26, 1944 |
| 2,501,783 | Morgan | Mar. 28, 1950 |